United States Patent
Liu

(10) Patent No.: US 9,910,130 B2
(45) Date of Patent: Mar. 6, 2018

(54) GEO-LOCATION USING KNOWN TARGET CO-CALIBRATION

(71) Applicant: THE BOEING COMPANY, Chicago, IL (US)

(72) Inventor: Yong Liu, Chicago, IL (US)

(73) Assignee: The Boeing Company, Chicago, IL (US)

( * ) Notice: Subject to any disclaimer, the term of this patent is extended or adjusted under 35 U.S.C. 154(b) by 663 days.

(21) Appl. No.: 14/176,912

(22) Filed: Feb. 10, 2014

(65) Prior Publication Data

US 2015/0226833 A1 Aug. 13, 2015

(51) Int. Cl.
*H04B 7/185* (2006.01)
*G01S 5/02* (2010.01)

(52) U.S. Cl.
CPC ............ *G01S 5/0247* (2013.01); *G01S 5/021* (2013.01)

(58) Field of Classification Search
CPC ...... G01S 19/53; G01S 5/0063; G01S 5/0247; G01S 5/021
USPC .......................... 342/140, 352, 357.2–357.25
See application file for complete search history.

(56) References Cited

U.S. PATENT DOCUMENTS

| | | | | |
|---|---|---|---|---|
| 4,754,280 A * | 6/1988 | Brown | ...................... | G01S 19/54 342/357.59 |
| 5,252,980 A * | 10/1993 | Gray | ...................... | G01S 13/003 342/107 |
| 6,580,389 B2 * | 6/2003 | Speyer | .................. | G01C 21/165 342/357.31 |
| 7,216,055 B1 * | 5/2007 | Horton | ................... | G01C 21/16 702/150 |
| 7,889,122 B2 * | 2/2011 | Tillotson | ................. | G01W 1/10 342/352 |
| 8,120,526 B2 * | 2/2012 | Holder | .................. | G01S 13/003 342/139 |
| 2003/0078705 A1 * | 4/2003 | Kumar | .................... | G01S 19/36 701/13 |
| 2005/0242991 A1 * | 11/2005 | Montgomery | .......... | G01S 19/15 342/357.36 |
| 2009/0182502 A1 * | 7/2009 | Riter | ....................... | G01S 19/07 701/472 |
| 2010/0109944 A1 * | 5/2010 | Whitehead | ............. | G01C 15/00 342/357.25 |
| 2011/0285590 A1 * | 11/2011 | Wellington | ............. | G01S 19/36 342/417 |
| 2013/0069822 A1 * | 3/2013 | Wu | ........................ | G01S 19/49 342/357.24 |

\* cited by examiner

*Primary Examiner* — Marcus E Windrich
(74) *Attorney, Agent, or Firm* — Haynes and Boone, LLP

(57) ABSTRACT

Systems, methods, and apparatus for geo-location using known target co-calibration are disclosed. In one or more embodiments, a method for geo-location of a target involves receiving, by at least three elements on a vehicle, at least one station signal from at least one station in a known direction from the vehicle. The method further involves calculating, by at least one processor, a roll estimate and a pitch estimate of the vehicle using at least one station signal. Also, the method involves receiving, by at least three elements on the vehicle, at least one target signal from the target. Further, the method involves calculating, by at least one processor, an azimuth direction and an elevation direction of the target using the roll estimate, the pitch estimate, and at least one target signal.

18 Claims, 7 Drawing Sheets

| | | Roll/Pitch/Yaw Errors | | | Calibration Site | | | Unknown Site | |
|---|---|---|---|---|---|---|---|---|---|
| | | Roll | Pitch | Yaw | AZ | EL | | AZ | EL |
| (deg) | | 0.04 | 0.04 | 0.04 | 6 | 6 | | -7 | -7 |
| (rad) | | 0.0007 | 0.0007 | 0.0007 | 0.10472 | 0.10472 | | -0.12217 | -0.12217 |
| | Estimated | | | | AZ Err | EL Err | | AZ Err | EL Err |
| (rad) | | 0.0006 | 0.0008 | 0 | -0.00078 | -0.00062 | | -0.00062 | -0.00078 |
| (deg) | | 0.0358 | 0.0442 | 0 | -0.04462 | -0.03560 | | -0.03572 | -0.04458 |
| (km) | | | | | | | | -22.3013 | -27.8278 |
| | | | | | | | Correction | | |
| (rad) | | | | | | | | -0.00078 | -0.00062 |
| | | | | | | | Post-Cal | | |
| (rad) | | | | | | | | 0.00016 | -0.00016 |
| (deg) | | | | | | | | 0.00904 | -0.00905 |
| (km) | | | | | | | | 5.64289 | -5.64814 |
| | | | | | | | Improvement | | |
| | | | | | | | | 75% | 80% |

300

GEO-LOCATION USING KNOWN TARGET CO-CALIBRATION

FIELD

The present disclosure relates to geo-location. In particular, it relates to geo-location using known target co-calibration.

BACKGROUND

Currently, conventional methods for geo-locating a target utilize a two-dimensional phased array, which includes a plurality of antenna/sensor elements. These conventional methods generate an estimate of the location of the target by using measured phases of the elements of the array and also by using the known baseline lengths of the elements of the array (i.e. the spacing between the elements). When the platform of the array has an attitude error that is large, this error will drastically degrade the accuracy of the location estimate of the target. As such, there is a need for an improved method and system for geo-location of a target.

SUMMARY

The present disclosure relates to a method, system, and apparatus for geo-location using known target co-calibration. In one or more embodiments, a method for geo-location of a target involves receiving, by at least three elements on a vehicle, at least one station signal from at least one station in a known direction from the vehicle. The method further involves calculating, by at least one processor, a roll estimate and a pitch estimate of the vehicle using at least one station signal. Also, the method involves receiving, by at least three elements on the vehicle, at least one target signal from the target. Further, the method involves calculating, by at least one processor, an azimuth direction and an elevation direction of the target using the roll estimate, the pitch estimate, and at least one target signal.

In one or more embodiments, when at least three elements on the vehicle receive at least one station signal from at least two of the stations, the method further involves calculating, by at least one processor, a yaw estimate of the vehicle using at least one station signal. In some embodiments, the calculating, by at least one processor, the azimuth direction and the elevation direction of the target further uses the yaw estimate.

In at least one embodiment, when at least three elements on the vehicle receive at least one station signal from at least three of the stations, the method further involves calculating, by at least one processor, a yaw estimate of the vehicle, an x-direction scan angle error of at least three elements, and a y-direction scan angle error of at least three elements using at least one station signal. In some embodiments, the calculating, by at least one processor, the azimuth direction and the elevation direction of the target further uses the yaw estimate, the x-direction scan angle error, and the y-direction scan angle error.

In one or more embodiments, at least one target signal is an electromagnetic signal. In some embodiments, the electromagnetic signal is a radio frequency signal, an optical signal, or an infra-red signal.

In at least one embodiment, at least three elements are configured in two-dimensions. In some embodiments, at least three elements are configured in an L-shape configuration.

In one or more embodiments, the target is airborne, terrestrial, or marine. In at least one embodiment, the vehicle is an airborne vehicle, a terrestrial vehicle, or a marine vehicle. In some embodiments, the airborne vehicle is a satellite. In one or more embodiments, at least one station is airborne, terrestrial, or marine.

In at least one embodiment, a system for geo-location of a target involves a vehicle. The system further involves at least three elements, on the vehicle, to receive at least one station signal from at least one station in a known direction from the vehicle, and to receive at least one target signal from the target. Further, the system involves at least one processor to calculate a roll estimate and pitch estimate of the vehicle using at least one station signal, and to calculate an azimuth direction and an elevation direction of the target using the roll estimate, the pitch estimate, and at least one target signal.

In one or more embodiments, when at least three elements on the vehicle receive at least one station signal from at least two of the stations, at least one processor is further to calculate a yaw estimate of the vehicle using at least one station signal. In some embodiments, at least one processor calculates the azimuth direction and the elevation direction of the target by further using the yaw estimate.

In at least one embodiment, when at least three elements on the vehicle receive at least one station signal from at least three of the stations, at least one processor is further to calculate a yaw estimate of the vehicle, an x-direction scan angle error of at least three elements, and a y-direction scan angle error of at least three elements using at least one station signal. In some embodiments, at least one processor calculates the azimuth direction and the elevation direction of the target by further using the yaw estimate, the x-direction scan angle error, and the y-direction scan angle error.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

Figure 6:
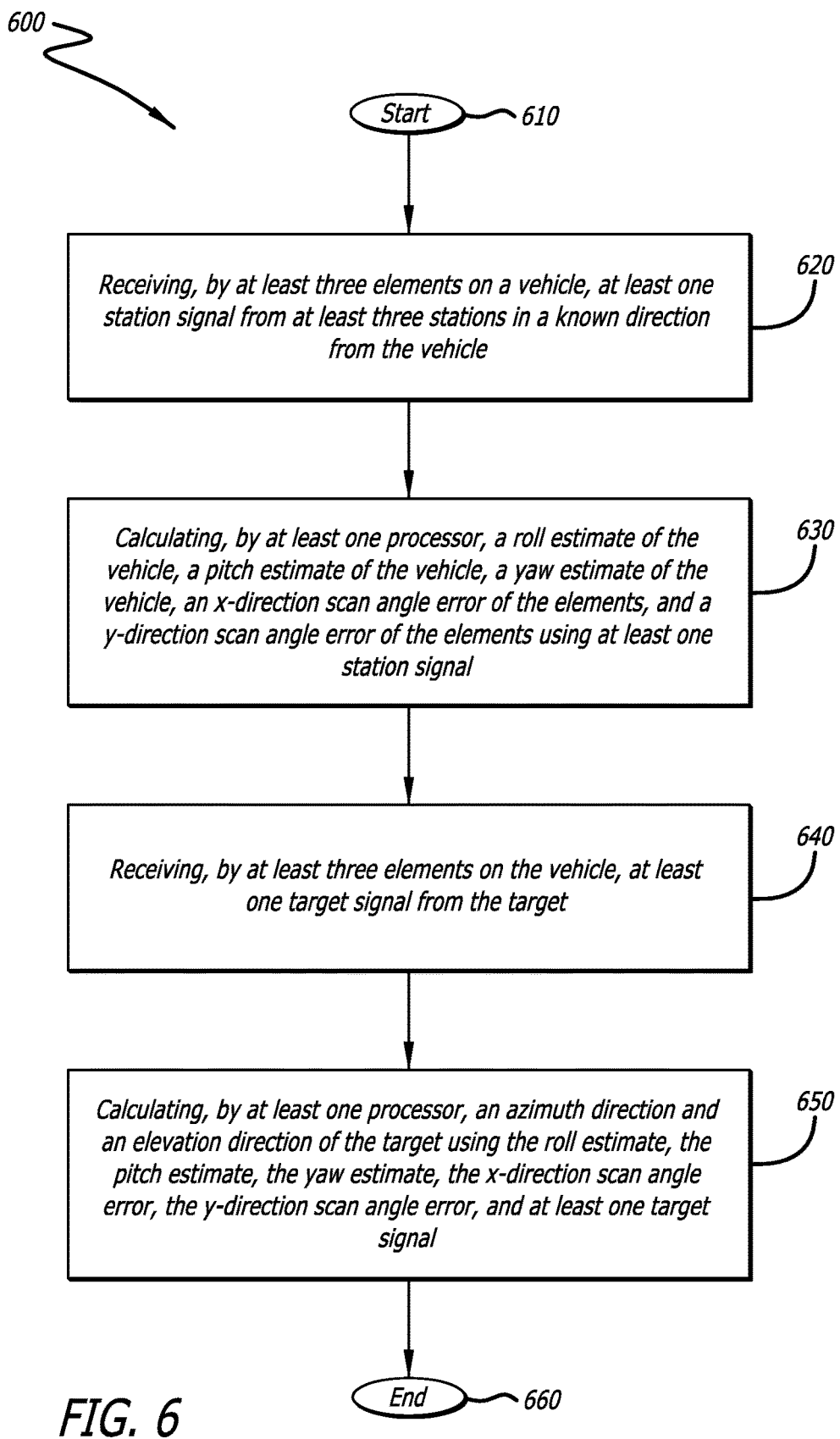

FIG. 6 is a flow chart for the disclosed method for geo-location using known target co-calibration, where the elements on the vehicle receive signals from at least three stations and an additional yaw estimate of the vehicle, an x-direction of the scan angle error of the elements, and a y-direction scan angle error of the elements are calculated, in accordance with at least one embodiment of the present disclosure.

DESCRIPTION

The methods and apparatus disclosed herein provide an operative system for geo-location using known target co-calibration. The disclosed system provides an approach to improve the accuracy for geo-locating a target (e.g., a ground target) in an unknown location. The approach makes use of the line of sight (LOS) information of at least one station (e.g., a ground station) in a known location in order to reduce the impact of vehicle's (e.g., a spacecraft, such as a satellite) platform pointing errors on the accuracy of the geo-location estimate of the target.

In particular, the present disclosure provides a system and method for error calibration of the vehicle's platform by using at least one station in a known location that emits electromagnetic signals (e.g., radio frequency (RF) signals), and by using a target in an unknown location that also emits electromagnetic signals. The vehicle's on-board phased array will intermittently receive signals from at least one station in a known location as well as receive signals from the target in an unknown location. An estimate of the vehicle platform's error correction terms (i.e. the platform's pointing errors) is made from the scan angle measurements from at least one station in a known location. The correction terms are then used for the improvement in accuracy of the estimate of the location of the target in an unknown location.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the system described herein is merely one example embodiment of the invention.

Figure 1:
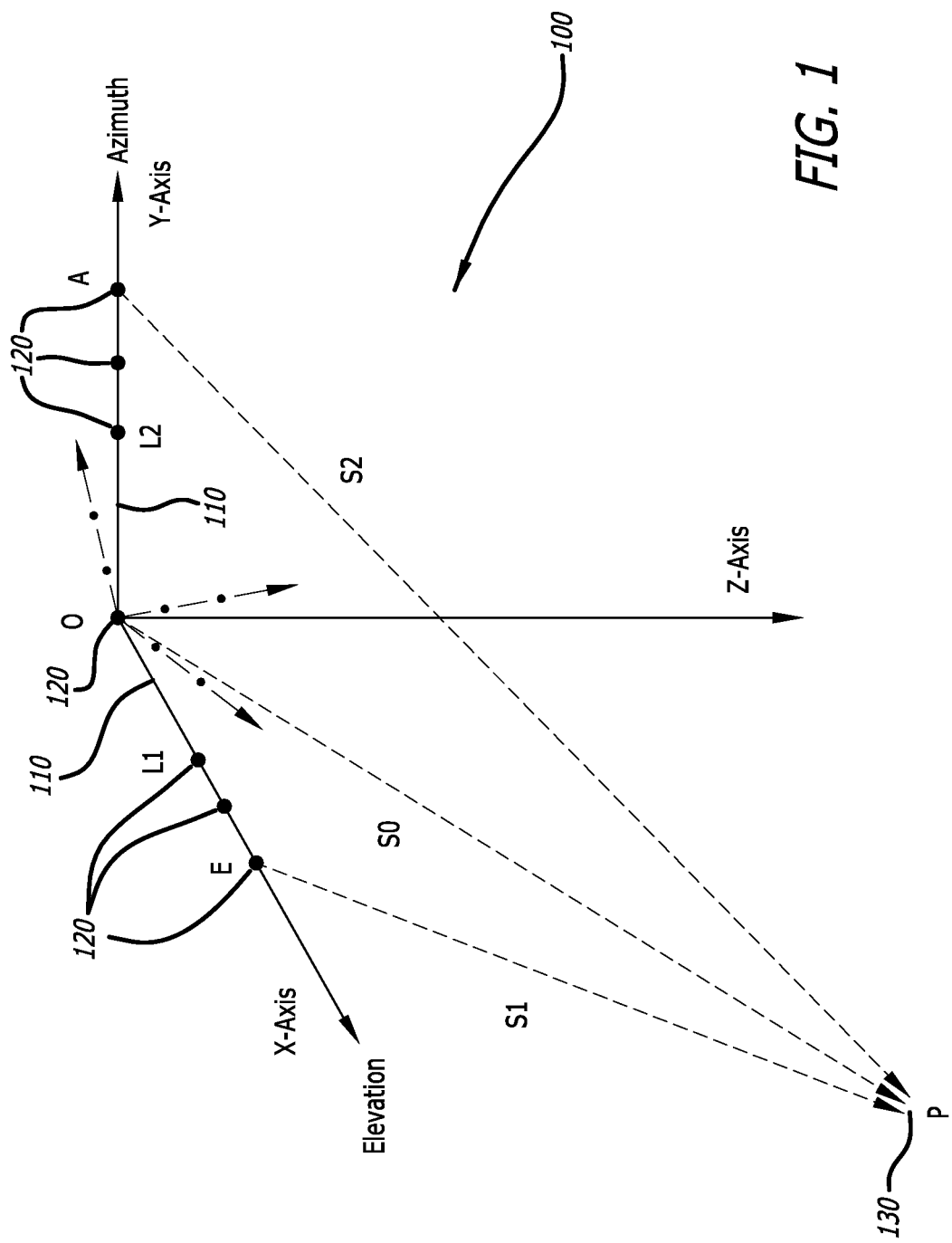
FIG. 1 is a schematic diagram of the geometry for the disclosed system for geo-location using known target co-calibration, in accordance with at least one embodiment of the present disclosure.

FIG. 1 is a schematic diagram 100 of the geometry for the disclosed system for geo-location using known target co-calibration, in accordance with at least one embodiment of the present disclosure. In this figure, an L-shaped antenna array 110, to be employed by the disclosed system, is depicted. The "array frame", which is the coordinate system frame (i.e. X, Y, and Z axes) of the antenna array 110, is denoted by bold solid lines. The L-shaped antenna array 110 itself lies on the X-axis (i.e. the elevation axis) and the Y-axis (i.e. the azimuth axis) of the array frame. In this figure, the antenna array 110 comprises seven (7) receiving sensor elements 120 (e.g., receive antennas). These seven elements 120 include elements E, O, A, L1, and L2, which are shown at various locations of the antenna array 110.

It should be noted that in other embodiments, the antenna array 110 may comprise more or less than seven elements 120, as is depicted in FIG. 1. For example, the antenna array 110 may comprise any number more than or equal to three (3) elements 120 (i.e. have greater than or equal to ($\geq$) three elements 120). In addition, it should be noted that in other embodiments, the antenna array 110 may be configured to be in other two-dimensional configurations other than in an L-shaped configuration, as is shown in FIG. 1.

The antenna array 110 is mounted on an antenna platform (i.e. a body). The "body frame", which is the coordinate system frame of the antenna platform, is denoted by dot-dashed lines. The antenna platform is mounted onto a vehicle. The vehicle may be an airborne vehicle (such as a satellite), a terrestrial vehicle, or a marine vehicle.

Also in this figure, line of sight (LOS) vectors (S0, S1, and S2) are denoted by dashed lines (for large distances, $\vec{S}_1 \approx \vec{S}_2 \approx \vec{S}_0$). The LOS S0, S1, and S2 vectors run from a source 130, located at point P, to elements E, O, and A 120, respectively. The source 130 transmits electromagnetic signals along the LOS vectors, and the signals are received by the elements 120. The electromagnetic signals may be, for example, radio frequency (RF) signals, optical signals, and/or infra-red signals. The source 130 may be, for example, a station in a known location (or, alternatively, may be simply an emitting source in a known location), or may be a target in an unknown location. It should be noted that the station may be airborne, terrestrial (e.g., a ground station), or marine. Also, it should be noted that the station may not actually be a station, but rather may simply be an emitting source. In addition, it should be noted that the target may be airborne (e.g. an aircraft), terrestrial (e.g., a tank), or marine.

The phase of the signal(s) received by the elements 120 that lie along the elevation axis (i.e. the X-axis of the array frame) of the antenna array 110 gives the elevation of point P in the array frame. Also, the phase of the signal(s) received by the elements 120 that lie along the azimuth axis (i.e. the Y-axis of the array frame) of the antenna array 110 gives the azimuth of point P in the array frame. The array frame is assumed to be misaligned from the body frame by roll (r), pitch (p), and yaw (y) angles.

The difference between the array frame and the body frame can be found by using a rotation direction cosine matrix (DCM) $C_{ab}$, where $$C_{ab} \approx I - [\xi \times] \leftarrow \xi = \begin{bmatrix} r \\ p \\ y \end{bmatrix} \leftarrow \text{roll, pitch, yaw errors}$$

and where, I is an identity matrix, and $$[\xi \times] \equiv \begin{bmatrix} 0 & -y & p \\ y & 0 & -r \\ -p & r & 0 \end{bmatrix}$$

such that, $$C_{ab} \approx \begin{bmatrix} 1 & y & -p \\ -y & 1 & r \\ p & -r & 1 \end{bmatrix}$$

Figure 2A:
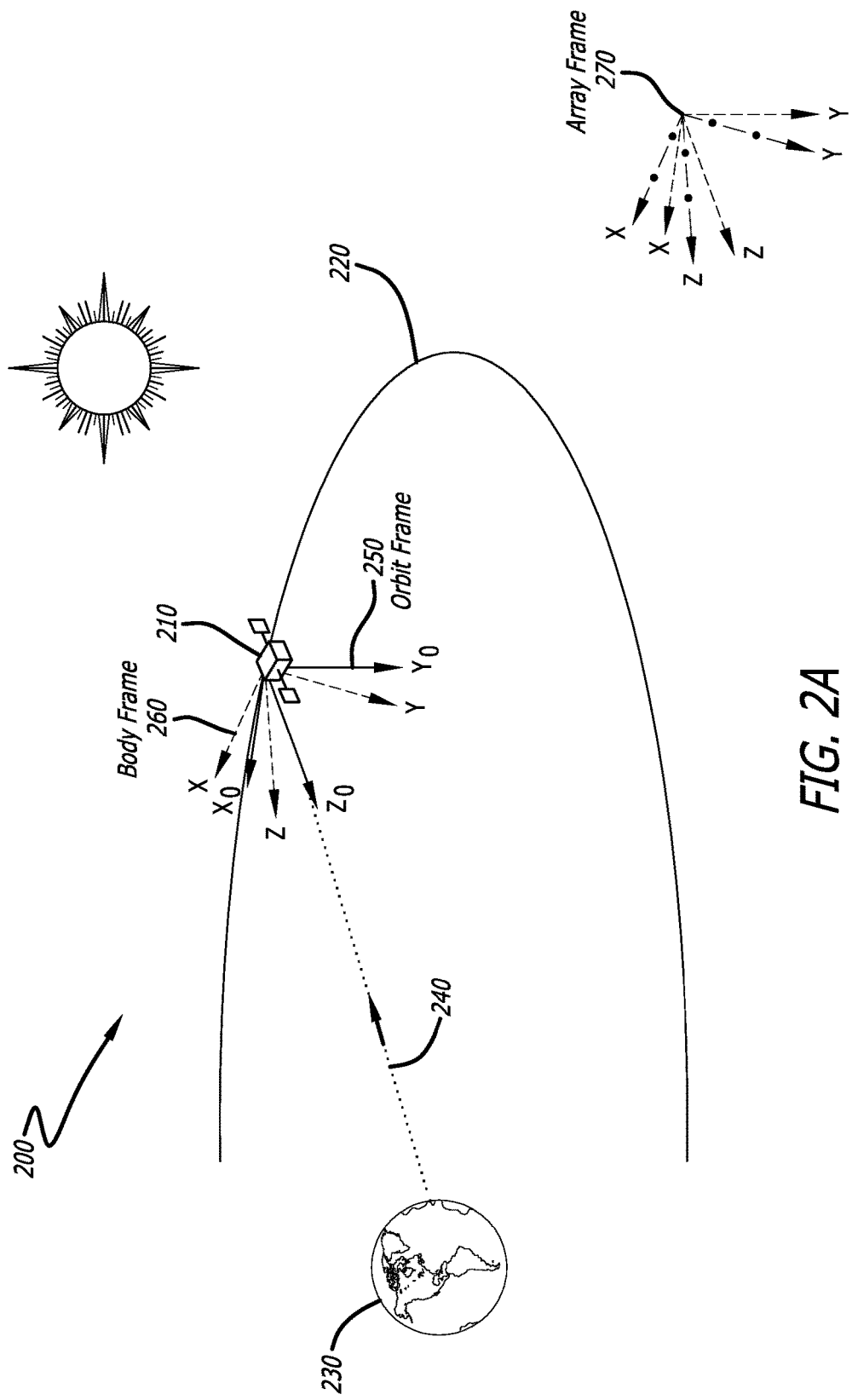
FIG. 2A is a schematic diagram illustrating the various different coordinate frames utilized by the disclosed system for geo-location using known target co-calibration, in accordance with at least one embodiment of the present disclosure.

FIG. 2A is a schematic diagram 200 illustrating the various different coordinate frames utilized by the disclosed system for geo-location using known target co-calibration, in accordance with at least one embodiment of the present disclosure. In this figure, the antenna array (refer to 110 of FIG. 1) is mounted on a satellite 210 in orbit 220 around Earth 230. Elements 120 on the antenna array 110 receive at least one signal 240 transmitted from a source on Earth 230. The source may be a station in a known location or a target in an unknown location.

The "orbit frame" 250 is the coordinate system frame (i.e. $X_O$, $Y_O$, and $Z_O$ axes) of the satellite, and is denoted by bold solid lines. Also, the "body frame" 260 is the coordinate system frame (i.e. X, Y, and Z axes) of the antenna platform, which is mounted on the satellite 210, and is denoted by dashed lines. In this figure, the orbit frame 250 is shown to be misaligned with the body frame 260.

The "array frame" 270 is the coordinate system frame (i.e. X, Y, and Z axes) of the antenna array, which is mounted onto the antenna platform, and is denoted by dot-dashed lines. In this figure, the array frame 270 is shown to be misaligned with the body frame 260. The array frame 270 is misaligned with the body frame 260 by the roll (r), pitch (p), and yaw (y) angles.

Figure 2B:
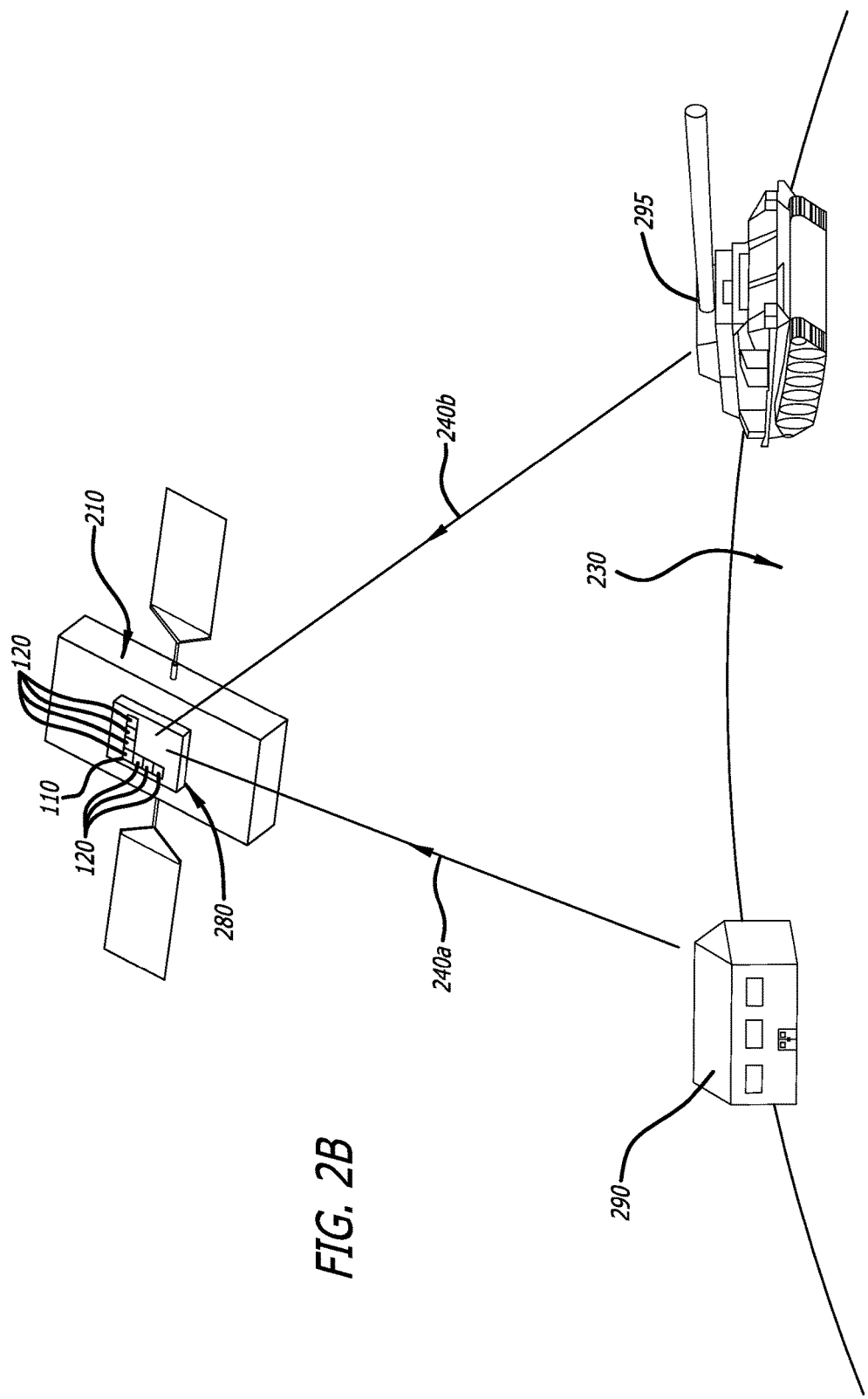
FIG. 2B is a schematic diagram illustrating the disclosed system for geo-location using known target co-calibration, in accordance with at least one embodiment of the present disclosure.

FIG. 2B is a schematic diagram illustrating the disclosed system for geo-location using known target co-calibration, in accordance with at least one embodiment of the present disclosure. In this figure, a satellite 210 (i.e. a vehicle), orbiting Earth 230, is shown to include an L-shaped antenna array 110 comprising seven (7) receiving sensor elements 120. The antenna array 110 is mounted onto an antenna platform 280. And, the antenna platform 280 is mounted onto the satellite 210. It should be noted that in other embodiments, the satellite (i.e. the vehicle) may be other types of airborne vehicles other than satellite (e.g., an aircraft or a space plane), or may be a terrestrial vehicle (e.g., a military tank) or a marine vehicle (e.g., a ship).

Also in this figure, two sources 290, 295 on Earth 230 are shown to each be transmitting at least one signal 240a, 240b to the satellite 210. One source is a ground station 290, and the other source is the target 295, which is depicted as a military tank. It should be noted that in other embodiments, more than one station 290 may be transmitting signals 240a to the satellite 110. In addition, it should be noted that in other embodiments, the ground station 290 may be airborne, terrestrial (e.g., a ground station), or marine. Also, it should be noted that the station 290 may not actually be a station, but rather may simply be an emitting source. Additionally, it should be noted that in other embodiments, the target 295 may be other types of terrestrial vehicles other than a military tank (e.g., a jeep), or may be airborne (e.g. an aircraft) or marine (e.g., a ship).

Methods for Geo-Location of a Target

The following is a detailed description of the disclosed methods for geo-location of a target, in accordance with at least one embodiment of the present disclosure. The disclosed methods utilize the geometry as shown in FIG. 1 as well as the various coordinate frames as shown in FIG. 2A. For these methods, elements 120 of an antenna array 110 (refer to FIG. 1), which is mounted on an antenna platform (refer to FIG. 2B) that is mounted on a satellite 210 orbiting 220 Earth 230 (refer to FIG. 2A), are receiving signals 240 transmitted from at least one station in a known location on Earth 230 and receiving signals 240 from the target in a unknown location on Earth 230. An estimate of the antenna platform's error correction terms (i.e. the platform's pointing errors) is made from the scan angle measurements from at least one station in a known location. The correction terms are then used for the improvement in accuracy of the estimate of the location of the target.

A. L-Shaped Two-Dimensional (2D) Array

For the disclosed methods, assume an L-shaped two-dimensional antenna array (refer to 110 in FIG. 1) has its nominal array frame (i.e. Xa, Ya, and Za axes) aligned with its body frame (e.g., xa and ya axes).

The array direction vectors $\vec{A}, \vec{E}$, may be expressed in the array ("a") frame as:

$$^a A = \begin{bmatrix} 1 \\ 0 \\ 0 \end{bmatrix}, \; ^a E = \begin{bmatrix} 0 \\ 1 \\ 0 \end{bmatrix}$$

Scan angle measurements from the two Xa and Ya array axes, "xscan" and "yscan", are obtained from phase measurements ($\phi_0, \phi_1, \phi_2, \ldots$) of the array elements and from the baseline lengths ($b_1, b_2, \ldots b_n$) of the array elements, which are the known spacings between the elements, such that:

$$\sigma_x = xscan \to \begin{cases} \varphi_{x1} = \varphi_{x0} + \dfrac{2\pi f}{c} b_{x1} \cos\sigma_x \\ \varphi_{x2} = \varphi_{x0} + \dfrac{2\pi f}{c} b_{x2} \cos\sigma_x \\ \ldots \\ \varphi_{xn} = \varphi_{x0} + \dfrac{2\pi f}{c} b_{xn} \cos\sigma_x \end{cases}$$

where there are "n" elements in the Xa axis of the antenna array, c is the speed of light, f is the frequency of the signal(s), $\phi_{x0}$ is the phase measurement of the element located at point O on the array (refer to FIG. 1) and $\phi_{x0}$ is used as a reference, and $\phi_1, \phi_{x2}, \ldots \phi_{xn}$ are the phase measurements of the array elements on the Xa array axis, and $$\sigma_y = yscan \to \begin{cases} \varphi_{y1} = \varphi_{y0} + \dfrac{2\pi f}{c} b_{y1} \cos\sigma_y \\ \varphi_{y2} = \varphi_{y0} + \dfrac{2\pi f}{c} b_{y2} \cos\sigma_y \\ \ldots \\ \varphi_{ym} = \varphi_{y0} + \dfrac{2\pi f}{c} b_{ym} \cos\sigma_y \end{cases}$$

where there are "m" elements in the Ya axis of the antenna array, c is the speed of light, f is the frequency of the signal(s), $\phi_{y0}$ is the phase measurement of the element located at point O on the array (refer to FIG. 1) and $\phi_{y0}$ is used as a reference, and $\phi_{y1}, \phi_{y2}, \ldots \phi_{ym}$ are the phase measurements of the array elements on the Ya array axis.

B. Line of Sight (LOS) and Array in Body Frame

For the disclosed methods, assume the target's line of sight (LOS) vector in the body frame is S. Also assume that "a" and "e" are the LOS azimuth and elevation angles, respectively.

The S vector, may be expressed in the body ("b") frame as:

$$^{b}S = \begin{bmatrix} \cos e \sin a \\ -\sin e \\ \cos e \cos a \end{bmatrix}$$

Scan angle measurements are related to the array direction and LOS direction unit vectors, such that $$\begin{cases} \vec{S} \cdot \vec{A}_{truth} = \cos \sigma_x \\ \vec{S} \cdot \vec{E}_{truth} = \cos \sigma_y \end{cases}$$

Array direction vectors due to roll, pitch, and yaw errors are $$\begin{cases} ^{b}A_{truth} = [C_{ab}]^T (^{a}A) \\ ^{b}E_{truth} = [C_{ab}]^T (^{a}E) \end{cases}$$

$C_{ab}$ is the DCM from the body frame to the array frame. The difference between the frames being the roll, pitch, and yaw errors of the antenna array's location on the body (e.g., on the bus of a satellite).

C. Definitions

The azimuth and elevation angles can be written as:

$$\begin{cases} a = a_0 + \Delta a \\ e = e_0 + \Delta e \end{cases}$$

"$a_0$" and "$e_0$" are the nominal azimuth and elevation angles (i.e. they are the azimuth and elevation angles when there are no errors in the system). "$\Delta a$" and "$\Delta e$" are the azimuth and elevation angle errors, respectively.

The LOS vector (i.e. the S vector) using the above definitions can be expressed as:

$$^{b}S = \begin{bmatrix} \cos(e_0 + \Delta e)\sin(a_0 + \Delta a) \\ -\sin(e_0 + \Delta e) \\ \cos(e_0 + \Delta e)\cos(a_0 + \Delta a) \end{bmatrix}$$

Recall that $$C_{ab} \approx \begin{bmatrix} 1 & y & -p \\ -y & 1 & r \\ p & -r & 1 \end{bmatrix},$$

and also recall that $$^{a}A = \begin{bmatrix} 1 \\ 0 \\ 0 \end{bmatrix}, \, ^{a}E = \begin{bmatrix} 0 \\ 1 \\ 0 \end{bmatrix}$$

As such, $$\begin{cases} ^{b}A_{truth} = [C_{ab}]^T (^{a}A) = \begin{bmatrix} 1 \\ y \\ -p \end{bmatrix} \\ ^{b}E_{truth} = [C_{ab}]^T (^{a}E) = \begin{bmatrix} -y \\ 1 \\ r \end{bmatrix} \end{cases}$$

D. Error Equations

The azimuth and elevation angles can be written as:

$$\begin{cases} \vec{S} \cdot \vec{A}_{truth} = \cos \sigma_x \\ \vec{S} \cdot \vec{E}_{truth} = \cos \sigma_y \end{cases} \rightarrow \begin{cases} ^{b}S \cdot {^{b}A_{truth}} = \cos \sigma_x \\ ^{b}S \cdot {^{b}E_{truth}} = \cos \sigma_y \end{cases}$$

Substitute $^{b}S$, $^{b}A_{truth}$, and $^{b}E_{truth}$ (as are expressed in the Definition section above) into the above equations to obtain:

$$\begin{cases} \cos(e_0 + \Delta e)\sin(a_0 + \Delta a) - y\sin(e_0 + \Delta e) - \\ \quad p\cos(e_0 + \Delta e)\cos(a_0 + \Delta a) = \cos \sigma_x \\ -y\cos(e_0 + \Delta e)\sin(a_0 + \Delta a) - \sin(e_0 + \Delta e) + \\ \quad r\cos(e_0 + \Delta e)\cos(a_0 + \Delta a) = \cos \sigma_y \end{cases}$$

Then, by expanding the above equations, using small angle approximation, we obtain the following equations, which relate to the azimuth and elevation errors of the target's LOS and the roll, pitch, and yaw errors:

$\cos \sigma_x = y\cos(e_0)\Delta e + y\sin(e_0) + \cos(a_0)\cos(e_0)\Delta a + \cos(e_0)\sin(a_0) -$ $\quad \cos(a_0)\sin(e_0)\Delta a \Delta e - \sin(a_0)\sin(e_0)\Delta e + p\cos(a_0)\cos(e_0) -$ $\quad p\cos(a_0)\sin(e_0)\Delta e - p\cos(e_0)\sin(a_0)\Delta a + p\sin(a_0)\sin(e_0)\Delta a \Delta$ $\cos \sigma_y = y\cos(a_0)\cos(e_0)\Delta a - \cos(e_0)\Delta e - \sin(e_0) - r\cos(a_0)\cos(e_0) +$ $\quad y\cos(e_0)\sin(a_0) + r\cos(a_0)\sin(e_0)\Delta e + r\cos(e_0)\sin(a_0)\Delta a -$ $\quad y\cos(a_0)\sin(e_0)\Delta a \Delta e - y\sin(a_0)\sin(e_0)\Delta e - r\sin(a_0)\sin(e_0)\Delta a \Delta e$ E. First-Order Azimuth and Elevation Errors Then, ignore the second-order and higher-order terms (e.g., ignore $\Delta a \Delta e$ product terms) to further expand the above equations to obtain:

$$\begin{cases} \cos \sigma_x = y\sin(e_0) + \cos(a_0)\cos(e_0)\Delta a + \cos(e_0)\sin(a_0) - \\ \quad \sin(a_0)\sin(e_0)\Delta e + p\cos(a_0)\cos(e_0) \\ \cos \sigma_y = -\cos(e_0)\Delta e - \sin(e_0) - r\cos(a_0)\cos(e_0) + y\cos(e_0)\sin(a_0) \end{cases}$$

Then, the nominal azimuth and elevation angles ($a_0$, $e_0$) can be calculated using the measured scan angles ($\sigma_x$, $\sigma_y$). Ignore the roll (r), pitch (p), yaw (y), $\Delta a$, and $\Delta e$ terms from the above equations to obtain:

No Error $\rightarrow \begin{cases} \cos\sigma_{x0} = \cos(e_0)\sin(a_0) \\ \cos\sigma_{y0} = -\sin(e_0) \end{cases} \rightarrow \begin{bmatrix} a_0 \\ e_0 \end{bmatrix} =$ function$(\sigma_x, \sigma_y) \leftarrow$ Nominal Solution If including scan angle measurement errors, substitute $$\begin{cases} \sigma_x \rightarrow \sigma_{x0} + \Delta\sigma_x \\ \sigma_y \rightarrow \sigma_{y0} + \Delta\sigma_y, \end{cases}$$

for the above $\cos \sigma_x$ and $\cos \sigma_y$ equations.
Then, the obtained error mapping equation is:

$$\begin{bmatrix} -\Delta\sigma_x \sin\sigma_{x0} - y\sin(e_0) - p\cos(a_0)\cos(e_0) \\ -\Delta\sigma_{y0}\sin\sigma_{y0} + r\cos(a_0)\cos(e_0) - y\cos(e_0)\sin(a_0) \end{bmatrix} =$$

$$\begin{bmatrix} \cos(a_0)\cos(e_0) & -\sin(a_0)\sin(e_0) \\ 0 & -\cos(e_0) \end{bmatrix} \begin{bmatrix} \Delta a \\ \Delta e \end{bmatrix}$$

F. Linear Error Mapping

The error mapping equation establishes a relationship between attitude errors (i.e. roll, pitch, and yaw errors (r, p, and y)), azimuth and elevation errors ($\Delta a$ and $\Delta e$), and scan angle errors ($\sigma_x$ and $\sigma_y$). The error mapping equation can be applied to stations in known locations as well as to targets in unknown locations.

The error mapping equation is:

$$\begin{bmatrix} -\Delta\sigma_x \sin\sigma_{x0} - y\sin(e_0) - p\cos(a_0)\cos(e_0) \\ -\Delta\sigma_{y0}\sin\sigma_{y0} + r\cos(a_0)\cos(e_0) - y\cos(e_0)\sin(a_0) \end{bmatrix} =$$

$$\begin{bmatrix} \cos(a_0)\cos(e_0) & -\sin(a_0)\sin(e_0) \\ 0 & -\cos(e_0) \end{bmatrix} \begin{bmatrix} \Delta a \\ \Delta e \end{bmatrix}$$

For the disclosed co-calibration application, there are two main steps. The first step is to apply the above error mapping equation to at least one station in a known location to estimate the attitude error (i.e. the roll, pitch, and yaw errors (r, p, and y)). The second step is to then use the obtained estimate of the attitude error for geo-location of a target in an unknown location, by estimating the azimuth and elevation errors ($\Delta a$ and $\Delta e$). The following Sections G.–M. describe in detail the co-calibration application.

G. Co-Calibration Approach

If a station(s) (e.g., a ground station) is in a known location, its geo-location information is available, and if the antenna array on a vehicle (e.g., a satellite) is pointing towards the ground station(s) in a time multiplex scheme, the effect of the roll, pitch, and yaw errors impact on the target in an unknown location can be estimated via the information obtained from measurements taken from the station in a known location.

For a station in a known location:

$$\begin{cases} \cos\sigma_{gx} = \cos(e_g)\sin(a_g) \\ \cos\sigma_{gy} = -\sin(e_g) \end{cases}$$

If using two stations in known locations and ignoring the scan angle measurement errors (i.e. $\Delta\sigma_x = 0$ and $\Delta\sigma_y = 0$), the co-calibration equations are:

$$\left. \begin{matrix} \begin{bmatrix} \cos(a_{g1})\cos(e_{g1}) & -\sin(a_{g1})\sin(e_{g1}) \\ 0 & -\cos(e_{g1}) \end{bmatrix} \begin{bmatrix} \Delta a_{g1} \\ \Delta e_{g1} \end{bmatrix} = C_{g1} \\ \begin{bmatrix} \cos(a_{g2})\cos(e_{g2}) & -\sin(a_{g2})\sin(e_{g2}) \\ 0 & -\cos(e_{g2}) \end{bmatrix} \begin{bmatrix} \Delta a_{g2} \\ \Delta e_{g2} \end{bmatrix} = C_{g2} \end{matrix} \right\} \rightarrow$$

$$\begin{bmatrix} \text{known from} \\ \text{ground station} \\ \text{and spacecraft ephemeris} \\ \text{info} \end{bmatrix}$$

It should be noted that a single station can provide two known locations at different time instants, where the station appears to have different LOS's from the spacecraft.

H. Roll, Pitch, and Yaw Estimate

Using two stations in known locations, the following equation is used to estimate the roll, pitch, and yaw:

$$\begin{bmatrix} C_{g1} \\ C_{g2} \end{bmatrix} = \begin{bmatrix} 0 & -\cos(a_{g1})\cos(e_{g1}) & -\sin(e_{g1}) \\ \cos(a_{g1})\cos(e_{g1}) & 0 & -\cos(e_{g1})\sin(a_{g1}) \\ 0 & -\cos(a_{g2})\cos(e_{g2}) & -\sin(e_{g2}) \\ \cos(a_{g2})\cos(e_{g2}) & 0 & -\cos(e_{g2})\sin(a_{g2}) \end{bmatrix} \begin{bmatrix} r \\ p \\ y \end{bmatrix}$$

$$\downarrow$$

$$\begin{bmatrix} \hat{r} \\ \hat{p} \\ \hat{y} \end{bmatrix} \rightarrow \begin{bmatrix} \text{can be estimated from either} \\ \text{batch or filter estimators} \end{bmatrix}$$

I. Unknown Target Estimate

With knowledge of roll, pitch, and yaw:

$$\begin{bmatrix} \hat{r} \\ \hat{p} \\ \hat{y} \end{bmatrix}$$

Procedurally, the antenna array can perform a quick scan back and forth between the various stations in known locations and the target in an unknown location to support the estimation procedure. It should be noted that the disclosed methods can use only a single station in a known location (as opposed to using two or more stations), but many measurements will need to be taken over time to obtain enough observability to estimate the roll, pitch, and yaw; and, time varying errors will need to be carefully considered.

Using the estimated roll, pitch, and yaw errors from the two stations' LOS errors, the resulting LOS error of the target can be estimated:

$$\begin{bmatrix} \Delta\hat{a} \\ \Delta\hat{e} \end{bmatrix} = \begin{bmatrix} \cos(a_{u0})\cos(e_{u0}) & -\sin(a_{u0})\sin(e_{u0}) \\ 0 & -\cos(e_{u0}) \end{bmatrix}^{-1}$$

$$\begin{bmatrix} -\Delta\sigma_x \sin\sigma_x - \hat{y}\sin(e_{u0}) - \hat{p}\cos(a_{u0})\cos(e_{u0}) \\ -\Delta\sigma_y \sin\sigma_y + \hat{r}\cos(a_{u0})\cos(e_{u0}) - \hat{y}\cos(e_{u0})\sin(a_{u0}) \end{bmatrix}$$

New azimuth and elevation estimates ($a_{u1}$ and $e_{u1}$) can be generated by using the estimated error ($\Delta\hat{a}$ and $\Delta\hat{e}$) in a recursive updated approach:

$$\begin{bmatrix} a_{u0} \\ e_{u0} \end{bmatrix};$$

initial estimate $$\begin{bmatrix} a_{u1} \\ e_{u1} \end{bmatrix} = \begin{bmatrix} a_{u0} \\ e_{u0} \end{bmatrix} + \begin{bmatrix} \Delta \hat{a} \\ \Delta \hat{e} \end{bmatrix}$$

J. Yaw Contribution

For a single station in a known location, the equation is:

$$C_{g1} = \begin{bmatrix} 0 & -\cos(a_{g1})\cos(e_{g1}) \\ \cos(a_{g1})\cos(e_{g1}) & 0 \end{bmatrix} \begin{bmatrix} r \\ p \end{bmatrix} + \begin{bmatrix} -\sin(e_{g1}) \\ -\cos(e_{g1})\sin(a_{g1}) \end{bmatrix} y$$

Sensitivity of yaw error, on the estimated azimuth and elevation errors, is much less than those of roll and pitch. As such, in most cases, yaw can be ignored without sacrificing much. For example, assume that the elevation is 6 degrees, and the azimuth is 6 degrees. As such, we obtain:

$$C_{g1} = \begin{bmatrix} 0 & -0.9981 \\ 0.9981 & 0 \end{bmatrix} \begin{bmatrix} r \\ p \end{bmatrix} + \begin{bmatrix} -0.1045 \\ -0.1040 \end{bmatrix} y \rightarrow 10{:}1 \text{ difference}$$

Thus, by reviewing the above equation, it is evident that since the yaw contribution is small, using only a single station in a known location (as opposed to using multiple stations in known locations) will likely be sufficient.

It should be noted that there may be concerns that yaw error is not very observable and, as such, the approach of using only a single station is not robust. However, the following example illustrates that yaw is indeed less observable and its impact on geo-location is also less and, as such, it does not affect the overall geo-location accuracy with the co-calibration approach.

K. Example—Using a Single Station in a Known Location

For this example, assume that the station in a known location has an azimuth of 6 degrees and an elevation of 6 degrees. In addition, assume that the target in an unknown location has an azimuth of −7 degrees and an elevation of −7 degrees. Additionally, assume that the roll, pitch, and yaw errors are each 0.04 degrees. As previously mentioned, since this example is only using a single station in a known location, it should be noted that no yaw estimation or correction will be performed, and the scan angle measurement errors will be ignored.

For this example, the pre-calibration LOS azimuth error will be equal to −0.03572, and the pre-calibration LOS elevation error will be equal to −0.04458. Thus, the geo-location of the target is found to have an azimuth of 22 kilometers (km) and an elevation of 27 km.

Also, the post-calibration LOS azimuth error will be equal to 0.00904, and the post-calibration LOS elevation error will be equal to −0.00905. Thus, the geo-location of the target is found to have an azimuth of 5.6 km and an elevation of 5.6 km.

Figure 3:
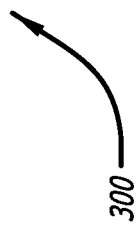
FIG. 3 is a table showing the improvement in the estimation of the location of an exemplary target by utilizing the disclosed system and method for geo-location using known target co-calibration, in accordance with at least one embodiment of the present disclosure.

FIG. 3 is a table 300 showing the improvement in the estimation of the location of an exemplary target by utilizing the disclosed system and method for geo-location using known target co-calibration, in accordance with at least one embodiment of the present disclosure. The table 300 provides an example of the effectiveness of the method using only a single station in a known location. The example uses one known calibration site (i.e. uses one station in a known location) located at azimuth, elevation bearings of approximately 6, 6 degrees (refer to table columns 6 and 7 in row 3) to calibrate the roll and pitch alignment errors between the array frame and the body frame. The yaw errors are assumed to be zero since they have been shown to not contribute significantly to the target location error, and estimating the additional yaw correction requires observing a second station in a known location.

Before calibration, the roll, pitch, and yaw errors are 0.04, 0.04, 0.04 degrees (refer to table columns 2, 3, and 4 in row 3). The roll and pitch errors are estimated to be 0.0358 and 0.0442 degrees (refer to table columns 2 and 3 in row 7) from the azimuth and elevation measurements to the station in a known location. The yaw error is assumed to be zero (refer to table column 4 in row 7).

After calibration, the station's azimuth, elevation uncertainties are −0.04462, −0.03560 degrees (refer to table columns 6 and 7 in row 7). The roll and pitch alignment corrections are then used to correct the azimuth and elevation measurements for the target. In this example, the target is located at azimuth, elevation bearings of approximately −7, −7 degrees (refer to table columns 9 and 10 in row 3) with the initial azimuth, elevation uncertainties of approximately −0.03572, −0.004458 degrees (refer to table columns 9 and 10 in row 7) that result in target location errors of −22.3013 and −27.8278 km (refer to table columns 9 and 10 in row 8) in the azimuth and elevation directions. As such, the roll, pitch, and yaw calibration corrects the target's azimuth, elevation angles by −0.00078, −0.00062 degrees (refer to table columns 9 and 10 in row 10). These corrections to the initial target azimuth, elevation angles have decreased the azimuth and elevation uncertainties of the target to 0.00904 and −0.00905 degrees (refer to table columns 9 and 10 in row 13) and the target location errors to 5.64289 and −5.64814 km (refer to table columns 9 and 10 in row 14) in the azimuth and elevation directions. Thus, these roll and pitch calibrations have reduced the initial target location errors by 75% and 80% (refer to table columns 9 and 10 in row 16) in the azimuth and elevation directions.

L. Scan Angle Consideration

The scan angles can be estimated (i.e. measured) from the phase measurements of multiple elements in one direction in the array. If there is a fixed bias in the estimated scan angle, the scan angle errors can be included in the geo-location estimation formulation for the target.

Recall that:

$$\sigma_x = xscan \rightarrow \begin{cases} \varphi_{x1} = \varphi_{x0} + \dfrac{2\pi f}{c} b_{x1}\cos\sigma_x \\ \varphi_{x2} = \varphi_{x0} + \dfrac{2\pi f}{c} b_{x2}\cos\sigma_x \\ \ldots \\ \varphi_{xn} = \varphi_{x0} + \dfrac{2\pi f}{c} b_{xn}\cos\sigma_x \end{cases}$$

M. Scan Angle Error Calibration

The co-calibration application can be used to estimate the scan angle estimation error to further improve the geo-location accuracy of the target.

If the scan angle error is independent of the target's LOS:

$$C_{g1} = \underbrace{\begin{bmatrix} 0 & -\cos(a_{g1})\cos(e_{g1}) & -\sin(e_{g1}) & -\sin\sigma_{g1x} & 0 \\ \cos(a_{g1})\cos(e_{g1}) & 0 & -\cos(e_{g1})\sin(a_{g1}) & 0 & -\sin\sigma_{g1y} \end{bmatrix}}_{M_{g1}} \begin{bmatrix} r \\ p \\ y \\ \Delta\sigma_x \\ \Delta\sigma_y \end{bmatrix}$$

$$\downarrow$$

$$\begin{bmatrix} C_{g1} \\ C_{g2} \\ C_{g3} \end{bmatrix} = \begin{bmatrix} M_{g1} \\ M_{g2} \\ M_{g3} \end{bmatrix} \begin{bmatrix} r \\ p \\ y \\ \Delta\sigma_x \\ \Delta\sigma_y \end{bmatrix} \rightarrow \begin{bmatrix} \hat{r} \\ \hat{p} \\ \hat{y} \\ \Delta\hat{\sigma}_x \\ \Delta\hat{\sigma}_y \end{bmatrix} \rightarrow \text{estimator to obtain solution}$$

It should be noted that the above equations are using three stations known locations in order to obtain the scan angle errors.

Method Summary for Geo-Location of a Target

The following is a description of the flow charts summarizing the disclosed methods for geo-location of a target, in accordance with at least one embodiment of the present disclosure.

Figure 4:
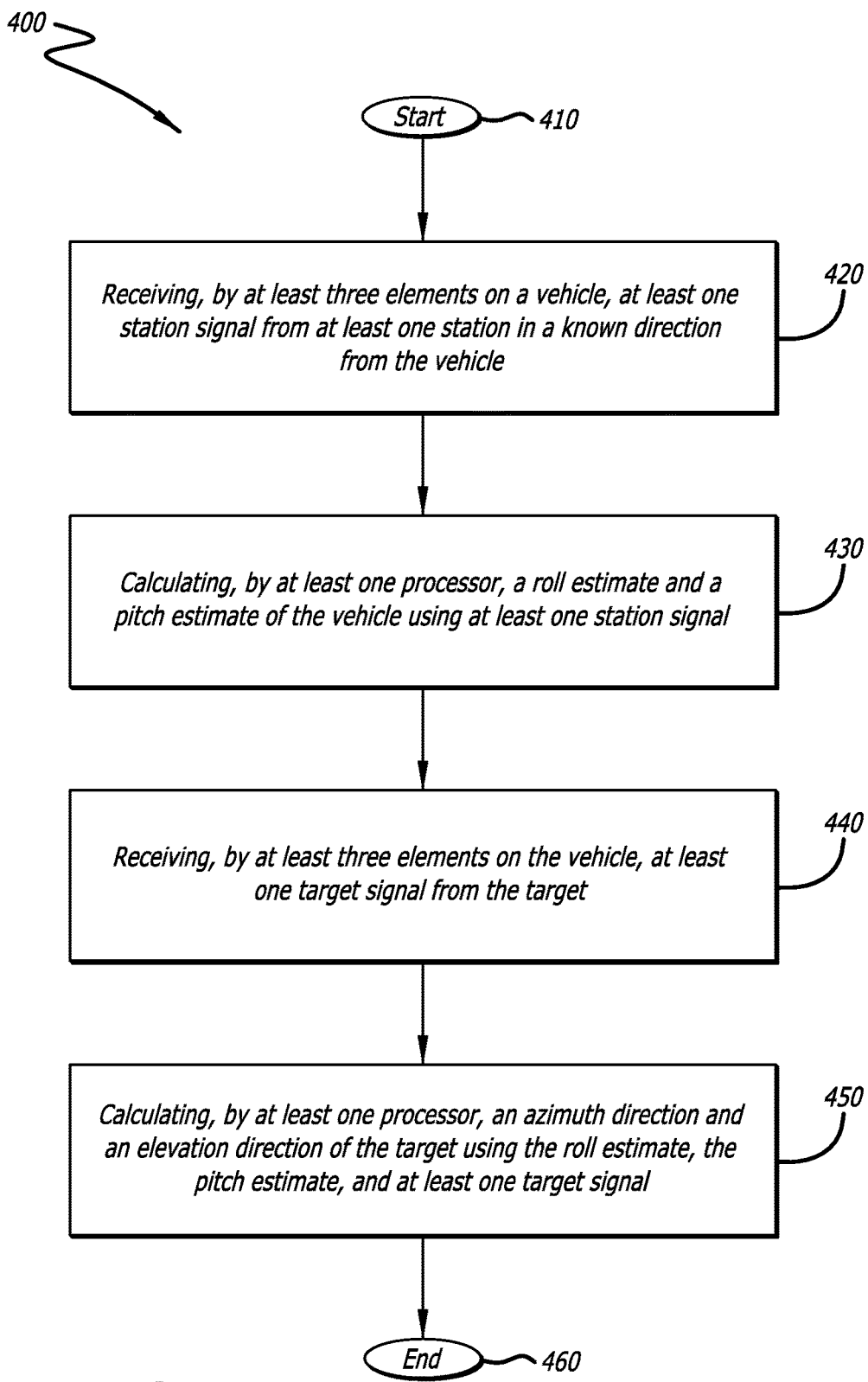
FIG. 4 is a flow chart for the disclosed method for geo-location using known target co-calibration, where the elements on the vehicle receive signals from at least one station, in accordance with at least one embodiment of the present disclosure.

FIG. 4 is a flow chart for the disclosed method 400 for geo-location using known target co-calibration, where the elements on the vehicle receive signals from at least one station, in accordance with at least one embodiment of the present disclosure. At the start 410 of the method 400, at least three elements on a vehicle receive at least one station signal from at least one station in a known direction from the vehicle 420. Then, at least one processor calculates a roll estimate and a pitch estimate of the vehicle using at least one station signal 430. At least three elements on the vehicle receive at least one target signal from the target in an unknown location 440. At least one processor then calculates an azimuth direction and an elevation direction of the target using the roll estimate, the pitch estimate, and at least one target signal 450. Then, the method 400 ends 460.

Figure 5:
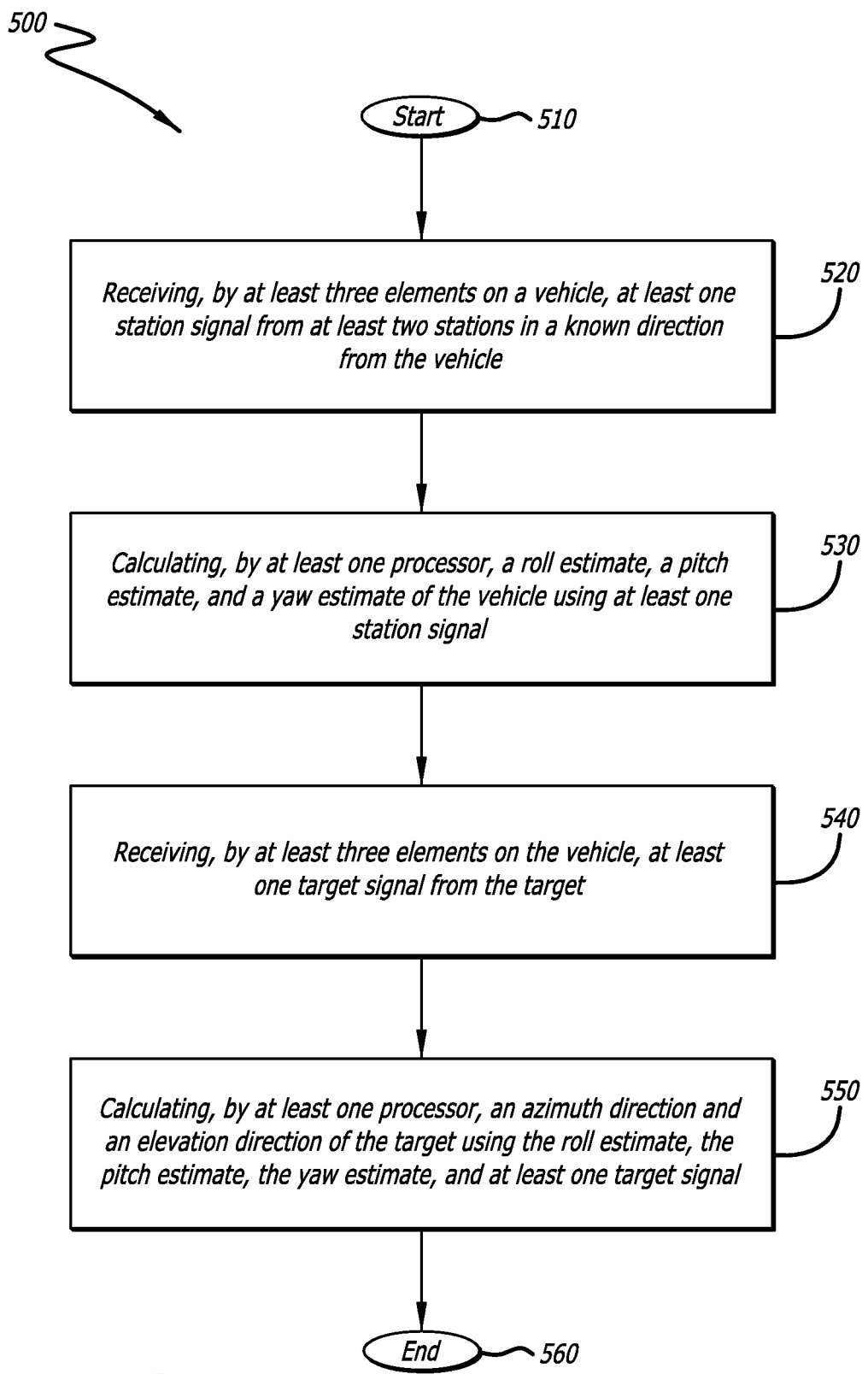
FIG. 5 is a flow chart for the disclosed method for geo-location using known target co-calibration, where the elements on the vehicle receive signals from at least two stations and an additional yaw estimate of the vehicle is calculated, in accordance with at least one embodiment of the present disclosure.

FIG. 5 is a flow chart for the disclosed method 500 for geo-location using known target co-calibration, where the elements on the vehicle receive signals from at least two stations and an additional yaw estimate of the vehicle is calculated, in accordance with at least one embodiment of the present disclosure. At the start 510 of the method 500, at least three elements on a vehicle receive at least one station signal from at least two stations in a known direction from the vehicle 520. Then, at least one processor calculates a roll estimate, a pitch estimate, and a yaw estimate of the vehicle using at least one station signal 530. At least three elements on the vehicle receive at least one target signal from the target in an unknown location 540. At least one processor then calculates an azimuth direction and an elevation direction of the target using the roll estimate, the pitch estimate, the yaw estimate, and at least one target signal 550. Then, the method 500 ends 560.

FIG. 6 is a flow chart for the disclosed method 600 for geo-location using known target co-calibration, where the elements on the vehicle receive signals from at least three stations and an additional yaw estimate of the vehicle, an x-direction of the scan angle error of the elements, and a y-direction scan angle error of the elements are calculated, in accordance with at least one embodiment of the present disclosure. At the start 610 of the method 600, at least three elements on a vehicle receive at least one station signal from at least three stations in a known direction from the vehicle 620. Then, at least one processor calculates a roll estimate of the vehicle, a pitch estimate of the vehicle, a yaw estimate of the vehicle, an x-direction scan angle error of the elements, and a y-direction scan angle error of the elements using at least one station signal 630. At least three elements on the vehicle receive at least one target signal from the target in an unknown location 640. At least one processor then calculates an azimuth direction and an elevation direction of the target using the roll estimate, the pitch estimate, the yaw estimate, the x-direction scan angle error, the y-direction scan angle error, and at least one target signal 650. Then, the method 600 ends 660.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for geo-location of a target, the method comprising:
    receiving, by at least three elements of an antenna array on a vehicle, at least one station signal from at least one station in a known direction from the vehicle,
    wherein at least one of the at least three elements is mounted on an elevation axis of an array frame of the antenna array, and at least one of the at least three elements is mounted on an azimuth axis of the array frame of the antenna array;
    calculating, by at least one processor, a roll estimate and a pitch estimate of the vehicle by using a phase of only one of the station signals, from only one of the stations, received by the at least one element mounted on the elevation axis to determine elevation of the only one of the stations in the array frame, and by using a phase of the only one of the station signals, from the only one of the stations, received by the at least one element mounted on the azimuth axis to determine azimuth of the only one of the stations in the array frame;
    receiving, by the at least three elements on the vehicle, at least one target signal from the target; and
    calculating, by the at least one processor, an azimuth direction and an elevation direction of the target using the roll estimate, the pitch estimate, and the at least one target signal.

2. The method of claim 1, wherein when the at least three elements on the vehicle receive the at least one station signal from at least two of the stations, wherein the at least one station signal from each of the at least two of the stations has a different line of sight (LOS) to the vehicle, the method further comprises calculating, by the at least one processor, a yaw estimate of the vehicle using the at least one station signal, and
    wherein the calculating, by the at least one processor, the azimuth direction and the elevation direction of the target further uses the yaw estimate.

3. The method of claim 1, wherein when the at least three elements on the vehicle receive the at least one station signal from at least three of the stations, the method further comprises calculating, by the at least one processor, a yaw estimate of the vehicle, an x-direction scan angle error of the at least three elements, and a y-direction scan angle error of the at least three elements using the at least one station signal, and
    wherein the calculating, by the at least one processor, the azimuth direction and the elevation direction of the target further uses the yaw estimate, the x-direction scan angle error, and the y-direction scan angle error.

4. The method of claim 1, wherein the at least one target signal is an electromagnetic signal.

5. The method of claim 4, wherein the electromagnetic signal is one of a radio frequency signal, an optical signal, and an infra-red signal.

6. The method of claim 1, wherein the at least three elements are configured in an L-shape configuration.

7. The method of claim 1, wherein the target is one of airborne, terrestrial, and marine.

8. The method of claim 1, wherein the vehicle is one of an airborne vehicle, a terrestrial vehicle, and a marine vehicle.

9. The method of claim 8, wherein the airborne vehicle is a satellite.

10. A system for geo-location of a target, the system comprising:
    a vehicle;
    at least three elements, of an antenna array on the vehicle, to receive at least one station signal from at least one station in a known direction from the vehicle, and to receive at least one target signal from the target,
    wherein at least one of the at least three elements is mounted on an elevation axis of an array frame of the antenna array, and at least one of the at least three elements is mounted on an azimuth axis of the array frame of the antenna array; and
    at least one processor (1) to calculate a roll estimate and pitch estimate of the vehicle by using a phase of only one of the station signals, from only one of the stations, received by the at least one element mounted on the elevation axis to determine elevation of the only one of the one stations in the array frame, and by using a phase of the only one of the station signals, from the only one of the stations, received by the at least one element mounted on the azimuth axis to determine azimuth of the only one of the stations in the array frame, and (2) to calculate an azimuth direction and an elevation direction of the target using the roll estimate, the pitch estimate, and the at least one target signal.

11. The system of claim 10, wherein when the at least three elements on the vehicle receive the at least one station signal from at least two of the stations, wherein the at least one station signal from each of the at least two of the stations has a different line of sight (LOS) to the vehicle, the at least one processor is further to calculate a yaw estimate of the vehicle using the at least one station signal, and
    wherein the at least one processor calculates the azimuth direction and the elevation direction of the target by further using the yaw estimate.

12. The system of claim 10, wherein when the at least three elements on the vehicle receive the at least one station signal from at least three of the stations, the at least one processor is further to calculate a yaw estimate of the vehicle, an x-direction scan angle error of the at least three elements, and a y-direction scan angle error of the at least three elements using the at least one station signal, and
    wherein the at least one processor calculates the azimuth direction and the elevation direction of the target by further using the yaw estimate, the x-direction scan angle error, and the y-direction scan angle error.

13. The system of claim 10, wherein the at least one target signal is an electromagnetic signal.

14. The system of claim 13, wherein the electromagnetic signal is one of a radio frequency signal, an optical signal, and an infra-red signal.

15. The system of claim 10, wherein the at least three elements are configured in an L-shape configuration.

16. The system of claim 10, wherein the target is one of airborne, terrestrial, and marine.

17. The system of claim 10, wherein the vehicle is one of an airborne vehicle, a terrestrial vehicle, and a marine vehicle.

18. The system of claim 17, wherein the airborne vehicle is a satellite.

* * * * *